United States Patent
Pizzola (10) Patent No.: US 10,953,492 B2
(45) Date of Patent: Mar. 23, 2021

(54) METHOD AND APPARATUS FOR AUTO-ALIGNING OF A PROCESS GAS JET NOZZLE AND LASER MACHINING BEAM

(71) Applicant: United Technologies Corporation, Farmington, CT (US)

(72) Inventor: Anthony Pizzola, Coventry, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 665 days.

(21) Appl. No.: 15/708,730

(22) Filed: Sep. 19, 2017

(65) Prior Publication Data

US 2019/0084084 A1  Mar. 21, 2019

(51) Int. Cl.
  *B23K 26/14* (2014.01)
  *B23K 26/142* (2014.01)
  *B23K 26/035* (2014.01)
  *B23K 26/042* (2014.01)
  *B23K 26/70* (2014.01)
  *B23K 26/08* (2014.01)

(52) U.S. Cl.
  CPC ........ *B23K 26/1494* (2013.01); *B23K 26/035* (2015.10); *B23K 26/042* (2015.10); *B23K 26/142* (2015.10); *B23K 26/1435* (2013.01); *B23K 26/1462* (2015.10); *B23K 26/1482* (2013.01); *B23K 26/0884* (2013.01); *B23K 26/70* (2015.10)

(58) Field of Classification Search
  CPC .............. B23K 26/1462; B23K 26/042; B23K 26/1494; B23K 26/1482; B23K 26/1435; B23K 26/035; B23K 26/142; B23K 26/70

USPC ........................................................ 219/121.6
See application file for complete search history.

(56) References Cited

U.S. PATENT DOCUMENTS

| 4,427,873 | A | * | 1/1984 | Orita | B23K 26/1435 |
| | | | | | 219/121.7 |
| 4,581,808 | A | * | 4/1986 | Lawson | B23B 29/03457 |
| | | | | | 29/558 |
| 7,345,257 | B2 | | 3/2008 | Yamazaki et al. | |
| 2016/0346871 | A1 | * | 12/2016 | Thorson | B23K 26/0869 |

FOREIGN PATENT DOCUMENTS

| CH | 703957 | B1 | 4/2014 |
| EP | 1600248 | A2 | 11/2005 |
| JP | H02217188 | A | 8/1990 |
| JP | 2003170287 | A | 6/2003 |
| JP | 3761657 | B2 | 3/2006 |
| JP | 2010023088 | A | 2/2010 |
| TW | 201444632 | A | 12/2014 |

OTHER PUBLICATIONS

European Search Report dated Feb. 15, 2019 issued for corresponding European Patent Application No. 18195416.5.

* cited by examiner

*Primary Examiner* — Dana Ross
*Assistant Examiner* — Kuangyue Chen
(74) *Attorney, Agent, or Firm* — Bachman & LaPointe, P.C.

(57) ABSTRACT

An adjustment collar for a laser machine tool includes a first actuator between an outer housing and an inner collar, the first actuator operable to move the inner collar with respect to the outer housing in the X-axis and a second actuator between the outer housing and the inner collar, the second actuator operable to move the inner collar with respect to the outer housing in the Y-axis.

6 Claims, 6 Drawing Sheets

METHOD AND APPARATUS FOR AUTO-ALIGNING OF A PROCESS GAS JET NOZZLE AND LASER MACHINING BEAM

BACKGROUND

The present disclosure relates to adjusting the relative positions of the axes of a laser machining beam and a process gas jet of a laser machining system.

In various types of laser machines, a process gas jet is directed at the laser machining point. In laser cutting, oxygen or inert gases such as nitrogen or argon, are used as process gases. Molten material that is formed in the course of the cutting process is intended to be blown away from the kerf by the process gases. In these processes, a desired relative position of the laser machining beam relative to the process gas jet is required. In laser cutting, optimum machining results are achieved when an axis of the laser beam and an axis of the gas jet coincide. When changing nozzles, during an impact of the nozzle, or just over time, the desired relative positioning of the laser beam axis and the gas jet axis may become misaligned.

SUMMARY

An adjustment collar for a laser machine tool according to one disclosed non-limiting embodiment of the present disclosure can include an outer housing; an inner collar; a first actuator between the outer housing and the inner collar, the first actuator operable to move the inner collar with respect to the outer housing along an X-axis; and a second actuator between the outer housing and the inner collar, the second actuator operable to move the inner collar with respect to the outer housing along a Y-axis.

A further embodiment of any of the embodiments of the present disclosure may include that the first actuator and the second actuator are piezoelectric motors.

A further embodiment of any of the embodiments of the present disclosure may include that the outer housing is mountable to a laser cutting head.

A further embodiment of any of the embodiments of the present disclosure may include that the inner collar is mountable to a process gas jet nozzle.

A further embodiment of any of the embodiments of the present disclosure may include a controller in communication with the first actuator and the second actuator.

A laser machine tool according to one disclosed non-limiting embodiment of the present disclosure can include a laser that defines a laser beam axis; a process gas jet nozzle that defines a gas jet axis; an adjustment collar mounted with respect to the laser and the process gas jet nozzle; and a controller in communication with the adjustment collar to move the process gas jet nozzle with respect to the laser to position the laser beam axis with respect to the gas jet axis.

A further embodiment of any of the embodiments of the present disclosure may include an outer housing of the adjustment collar, the outer housing mounted to a laser cutting head that contains the laser.

A further embodiment of any of the embodiments of the present disclosure may include an inner collar of the adjustment collar mounted to the process gas jet nozzle.

A further embodiment of any of the embodiments of the present disclosure may include a first actuator between the outer housing and the inner collar, the first actuator operable to move the inner collar with respect to the outer housing in an X-axis; and a second actuator between the outer housing and the inner collar, the second actuator operable to move the inner collar with respect to the outer housing in a Y-axis.

A further embodiment of any of the embodiments of the present disclosure may include, that the first actuator and the second actuator are piezoelectric motors.

A method for adjusting an adjusting collar to move a process gas jet nozzle with respect to a laser cutting head to align a gas jet axis with respect to a laser beam axis, the method according to one disclosed non-limiting embodiment of the present disclosure can include adjusting a first actuator between an outer housing of an adjusting collar mounted to a laser cutting head and an inner collar of the adjusting collar, the first actuator operable to move the inner collar with respect to the outer housing along an X-axis; and adjusting a second actuator between the outer housing of the adjusting collar mounted to the laser cutting head and the inner collar of the adjusting collar, the second actuator between the outer housing and the inner collar, the second actuator operable to move the inner collar with respect to the outer housing along a Y-axis.

A further embodiment of any of the embodiments of the present disclosure may include determining a location of the laser beam axis based on a position of the laser cutting head; cutting a hole in a sacrificial workpiece with the laser of the laser cutting head; measuring the hole with a process gas jet nozzle mounted to the laser cutting head to determine a location of a gas jet axis at a center of the hole; comparing the location of the gas jet axis with respect to the location of the laser beam axis; and adjusting the adjusting collar to move the process gas jet nozzle with respect to the laser cutting head to align the gas jet axis with respect to the laser beam axis.

A further embodiment of any of the embodiments of the present disclosure may include that determining the location of the laser beam axis is presumed to be a central axis of the laser cutting head.

A further embodiment of any of the embodiments of the present disclosure may include determining a capacitance with the process gas jet nozzle to find the edge of the hole.

A further embodiment of any of the embodiments of the present disclosure may include moving the process gas jet nozzle along an X-axis.

A further embodiment of any of the embodiments of the present disclosure may include moving the process gas jet nozzle along an Y-axis.

A further embodiment of any of the embodiments of the present disclosure may include automatically adjusting the adjusting collar in response to a controller to align the first axis location to the center of the hole.

A further embodiment of any of the embodiments of the present disclosure may include that to align the first axis location to the center of the hole aligns a gas jet axis with respect to a laser beam axis.

A further embodiment of any of the embodiments of the present disclosure may include that to align the first axis location to the center of the hole aligns a gas jet axis with respect to a laser beam axis such that the axes are coaxial.

The foregoing features and elements may be combined in various combinations without exclusivity, unless expressly indicated otherwise. These features and elements as well as the operation of the invention will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
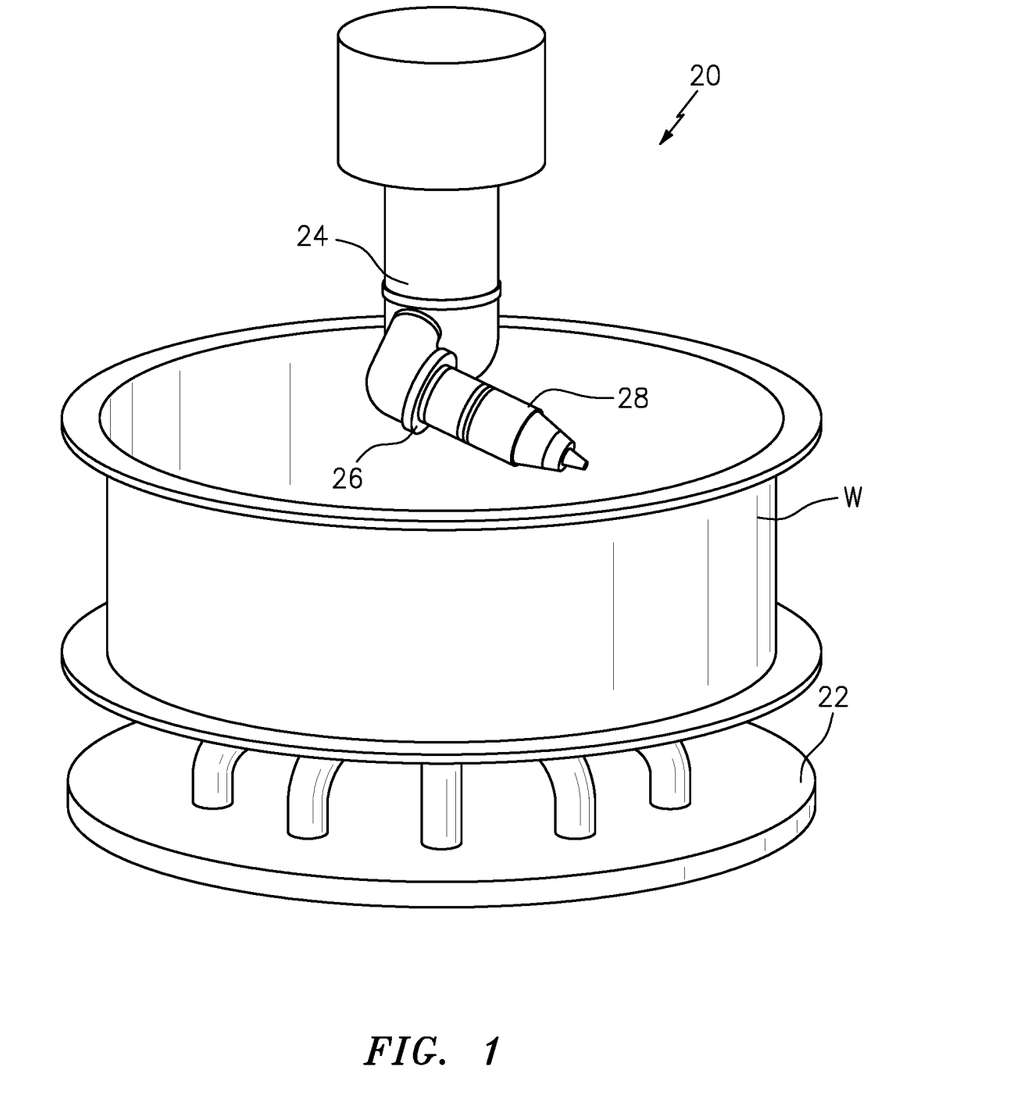
FIG. 1 is a schematic view of a laser cutting machine during workpiece cutting.

FIG. 1 schematically illustrates a laser machine tool 20 in the form of a laser cutting machine. The laser machine tool 20 generally includes a machine bed 22, over which a first joint 24 is movably guided in a first axial direction. The first joint 24 supports a second joint 26 with a laser cutting head 28. Jointly with the second joint 26, the laser cutting head 28 is movable in a second axial direction relative the first joint 24. Furthermore, the laser cutting head 28 is movable relative to the second joint 26 in a third axial direction. Beneath the laser cutting head 28, a workpiece W is arranged on the machine bed 22.

Figure 2:
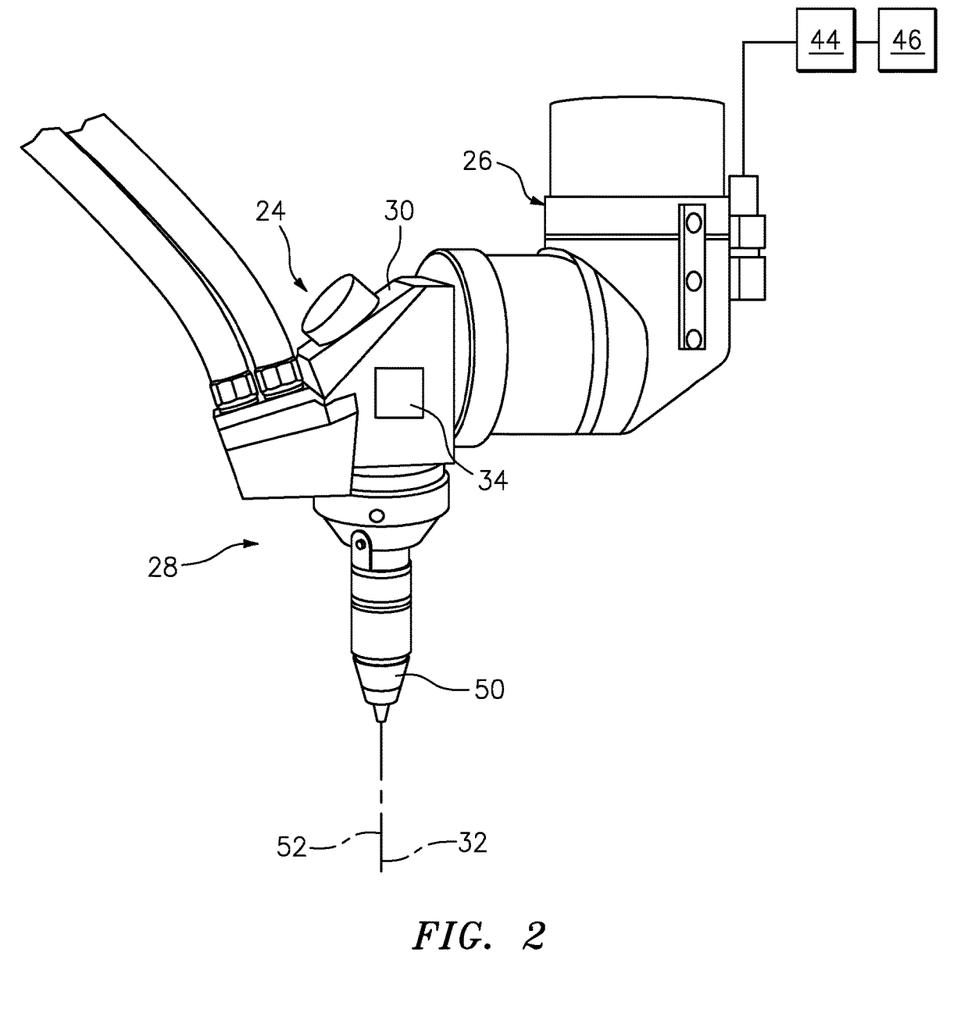
FIG. 2 is a schematic view of a laser cutting head of the laser cutting machine according to FIG. 1.

With reference to FIG. 2, the laser cutting head 28 includes a laser 30 that generates a laser beam along a laser beam axis 32. The laser 30 is contained within the laser cutting head 28 and may be directed through optics 34 to direct the laser beam through a process gas jet nozzle 50. The mobility of the first joint 24 and the second joint 26 permits a desired point on the workpiece W to be machined with the laser cutting beam. The mobility of the laser cutting head 28 in the Z-direction is used to adjust the focal position of the laser cutting beam in the direction transverse to the workpiece W.

A motor drive 44 of the laser machine tool 20, which is controlled by a controller 46, is used to move the laser cutting head 28. The motor drive 44 may be operable to move the laser cutting head 28 in a coordinate system. For example, a 6-axis laser machine tool 20 has the ability to interpolate either linearly for X, Y, Z, or rotationally A, B, and U. In addition, an R axis may be defined for each orientation of the coordinate systems when viewed isometrically. The R axis is an artificial axis created by the machine software that can move the laser cutting head 28 parallel along a vector created normal to the workpiece W, however nomenclature often varies by machine. The operation of the laser machine tool 20 may also be integrated into the controller 46 to position the laser 30 and the associated process gas jet nozzle 50. The controller 46 is operable to continually determine the position of the laser cutting head 28 within the coordinate system.

The process gas jet nozzle 50 is mounted to the laser cutting head 28. A process gas jet, for example nitrogen, is directed from the process gas jet nozzle 50 to blow the molten metal formed at the machining point of the laser beam from the resulting kerf. Ideally, the laser beam axis 32 from the laser 30, and a gas jet axis 52 of the process gas jet nozzle 50 coincide in a coaxial manner. That is, the laser beam is directed along the gas jet axis 52 of the process gas jet nozzle 50.

In routine operation of the laser machine tool 20, however, the laser cutting beam axis 32 and the process gas jet axis 52 may move out of alignment. To adjust any variation of the actual relative positions of the laser beam axis 32 and the gas jet axis 52 from the desired coaxial positioning, an adjustment collar 60 is mounted between the laser cutting head 28 and the process gas jet nozzle 50 to adjust the laser beam axis 32 and the gas jet axis 52.

Figure 3:
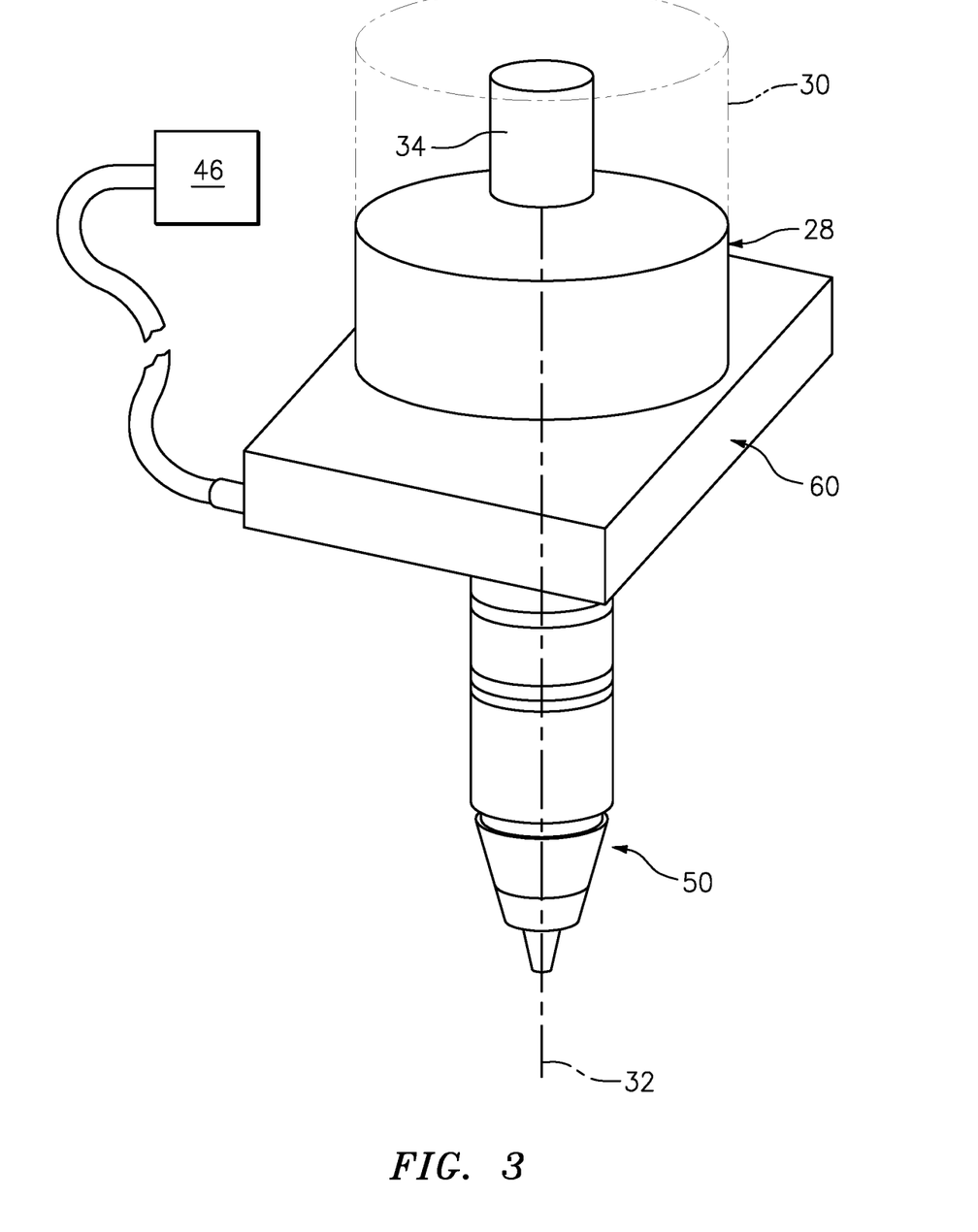
FIG. 3 is a schematic view of the laser cutting head with an adjustment collar.

With reference to FIG. 3, the controller 46 is operable to determine the position of the laser cutting head 28 within the coordinate system. The process gas jet nozzle 50 is also utilized as a sensor for the controller 46 as the process gas jet nozzle 50 measures capacitance at a tip thereof to, for example, identify an edge of a hole in the workpiece W as the capacitance changes at the edge. Other methods for determining misalignment exist such as via a bore camera through the process gas jet nozzle 50.

Figure 4:
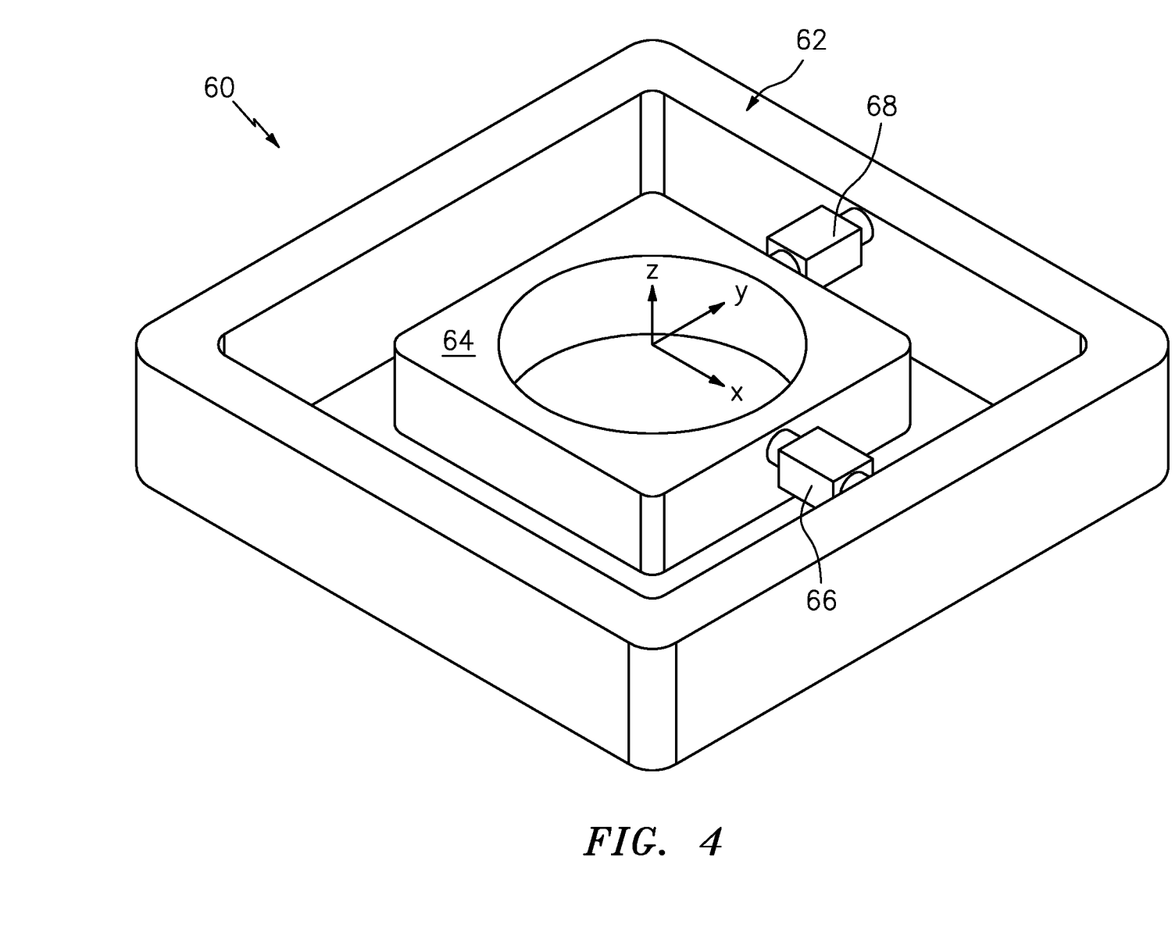
FIG. 4 is a schematic view of the adjustment collar.

With reference to FIG. 4, the adjustment collar 60 generally includes an outer housing 62 mounted to the laser cutting head 28 and an inner collar 64 mounted to the process gas jet nozzle 50. An actuator 66 in the X-axis and an actuator 68 in the Y-axis are mounted between the outer housing 62 inner collar 64 to position the inner collar 64 with respect to the outer housing 62. The actuators 66, 68 may be piezoelectric motors that have an accuracy of, in one example, 0.8 nanometers. In another example, the actuators 66, 68 have 130 kHz drive frequency that provides speeds of 250 mm/s, and a dynamic resolution of less than 1.0 micron. The actuators 66, 68 are in communication with the controller 46.

Figure 5:
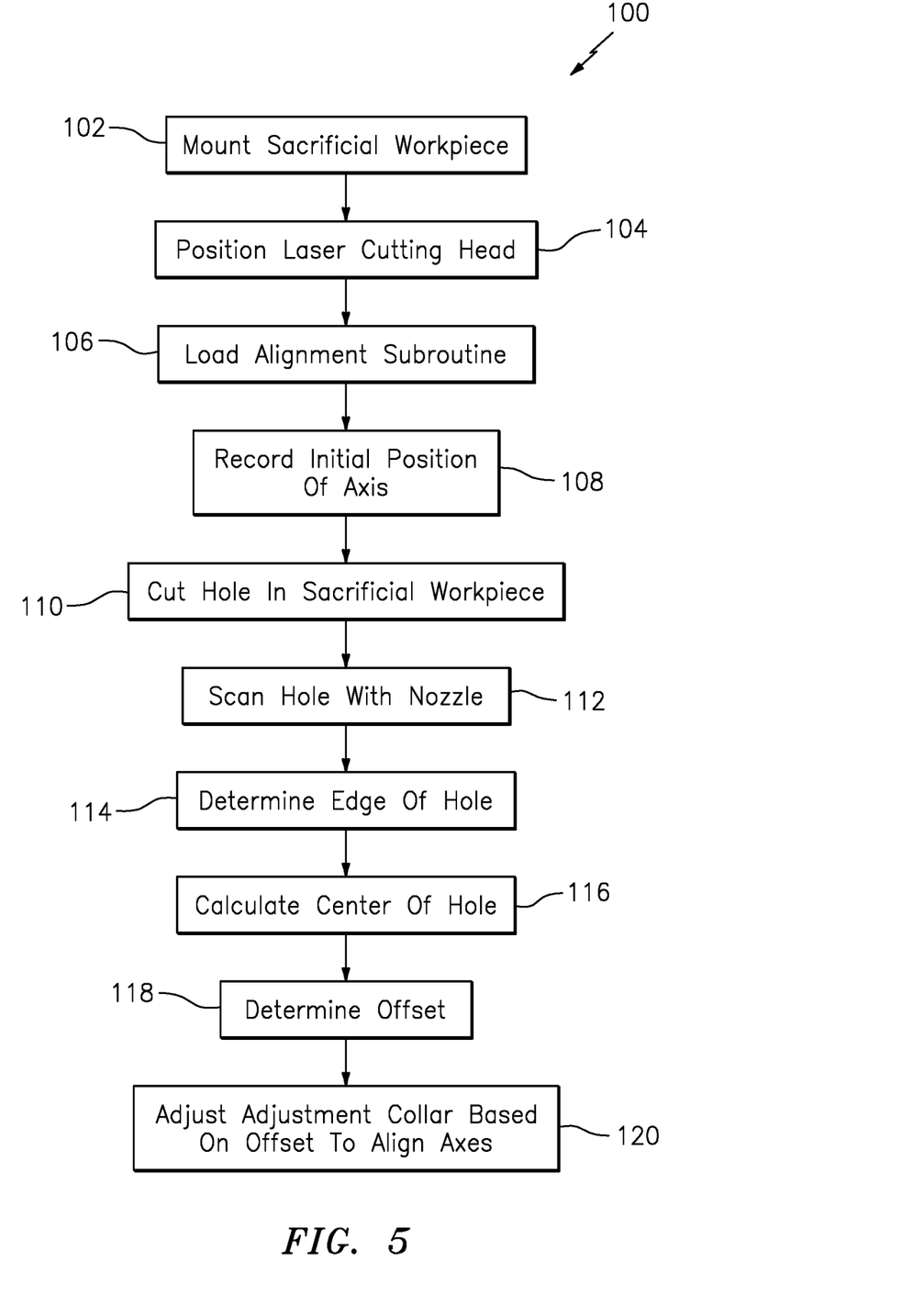
FIG. 5 is a block diagram flowchart of a method to align a laser and a process gas jet nozzle of the laser cutting head.

With reference to FIG. 5, a method 100 for positioning the laser beam and an associated process gas jet of the laser machine tool 20 includes mounting (102) a sacrificial workpiece W in the laser machine tool 20.

Figure 6:
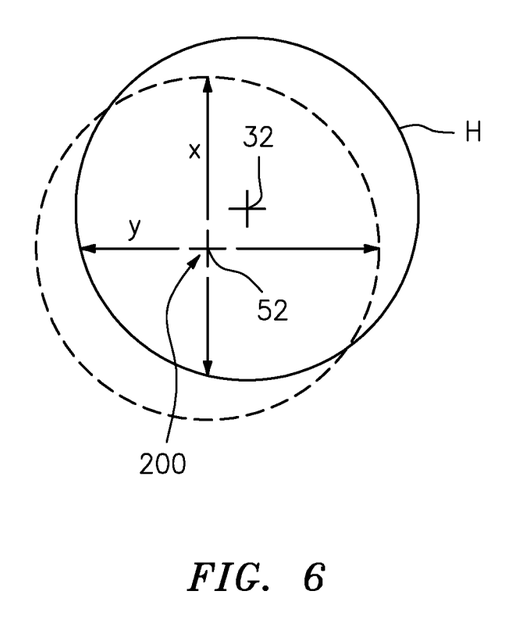
FIG. 6 is a schematic view of a sacrificial hole and alignment relationship between the laser that cut the hole and the process gas jet nozzle that is utilized to measure the hole.

Next, an operator positions (104) the laser cutting head 28 over the sacrificial workpiece W. The operator then loads (106) a subroutine for aligning the laser beam axis 32 with respect to the gas jet axis 52 into the controller 46. The subroutine may be an algorithm or other machine program that operates on the controller 46. Once the operator initially positions the laser cutting head 28 over the sacrificial workpiece W, the algorithm identifies this initial position 200 (FIG. 6) as the initial gas jet axis 52 location and records this as the initial axis position (108).

From the initial position, the algorithm activates the laser 30 of the laser cutting head 28 to cut (110) a hole "H" in the sacrificial workpiece W. The hole "H" that is cut may be of an arbitrary size, such as 0.5 inches (12.7 mm) in diameter. The laser beam at the focal point on the workpiece W is, for example, 0.005 inches (0.127 mm) in diameter. The exit of the process gas jet nozzle 50 is typically 0.060-0.080 inches (1.5-2.0 mm) in diameter.

The process gas jet nozzle 50 initial position (the initial gas jet axis 52 location) is the initial laser beam axis 32 location if coaxially aligned. The laser 30, and thus the laser beam axis 32, however, may be misaligned with the gas jet axis 52 and thus the laser 30 is not coaxial with the process gas jet nozzle 50. This offset is determined and corrected by the method 100.

Once the hole "H" is cut, the controller 46 then utilizes the process gas jet nozzle 50 to scan (112) the hole "H" to determine an edge (114) of the hole. The hole "H" may be scanned along the X-axis and the Y-axis such that an edge is sensed by a change in capacitance sensed at the process gas jet nozzle 50. Since the hole is circular, only a few points on the edge need be determined to identify the hole location, diameter, and thus the center thereof. The controller 46 then uses the edge location to calculate where a center (116) of the hole "H" is located in the sacrificial workpiece W. That is, the difference between the laser beam axis 32 with respect to the gas jet axis 52 is determined because the laser 30 cuts the hole "H" without knowing the center as the center is the initial gas jet axis 52 is obtained from the original position of the laser cutting head 28, but the process gas jet nozzle 50 measures the hole "H" such that any discrepancy therebetween is identified. That is, the laser cutting head 28 original position is known, but the process gas jet nozzle 50 may not be coaxial with the laser 30.

The offset between the laser beam axis 32 and the gas jet axis 52 is then determined (118) by the controller 46. The determined offset of the laser beam axis 32 from the gas jet axis 52 forms the basis for a correction of the relative position of the two axes 32, 52 in a closed loop manner through the adjustment collar 60. The algorithm then utilizes the offset between the laser beam axis 32 with respect to the gas jet axis 52 in the X and Y axes and communicates the location to the controller 46. The algorithm then adjusts (120) the actuators 66, 68 to align the laser beam axis 32 and the gas jet axis 52 to compensate for the offset and bring the axes into a coaxial relationship. The actuators 66, 68 provide accurate, precise and repeatable alignment of the laser beam axis 32 and the gas jet axis 52 with minimal operator intervention and facilitate increased alignment opportunities during manufacturing.

The method 100 essentially removes operator intervention and potential error with respect to physically aligning the laser machine tool process gas jet nozzle and the laser. This facilitates replacement of the current style set screw aperture that exists with an electronically controlled aperture of the same form factor. The piezoelectric motors move accurately in the X-Y plane using feedback from the algorithm such that the laser beam axis 32 and the gas jet axis 52 automatically align. The adjustment collar 60 does not increase the physical size of the laser cutting head 28 and are readily retrofitted.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An adjustment collar mounted between a laser cutting head and a process gas jet nozzle for a laser machine tool, comprising:
   an outer housing mountable to the laser cutting head;
   an inner collar mountable to the process gas jet nozzle, the inner collar within the outer housing, the laser cutting head positioned to direct a laser beam through the process gas jet nozzle, the process gas jet nozzle operable as a sensor to measure capacitance;
   a first actuator between the outer housing and the inner collar, the first actuator operable to move the inner collar with respect to the outer housing along an X-axis;
   a second actuator between the outer housing and the inner collar, the second actuator operable to move the inner collar with respect to the outer housing along a Y-axis; and
   a controller in communication with the first actuator and the second actuator to move the process gas jet nozzle with respect to the laser cutting head to align a gas jet axis with respect to a laser beam axis in response to determining a capacitance with the process gas jet nozzle to find an edge of a hole in a sacrificial workpiece formed by the laser beam of the laser cutting head.

2. The adjustment collar as recited in claim 1, wherein the first actuator and the second actuator are piezoelectric motors.

3. The adjustment collar as recited in claim 2, wherein the controller adjusts the actuators to align the laser beam axis and the gas jet axis to compensate for the offset and bring the axes into a coaxial relationship.

4. The adjustment collar as recited in claim 2, wherein the piezoelectric motors have an accuracy of 0.8 nanometers, a 130 kHz drive frequency that provides speeds of 250 mm/s, and a dynamic resolution of less than 1.0 micron.

5. A laser machine tool, comprising:
   a laser cutting head that defines a laser beam axis;
   a process gas jet nozzle that defines a gas jet axis, the laser cutting head positioned to direct a laser beam through the process gas jet nozzle, the process gas jet nozzle operable as a sensor to measure capacitance;
   an adjustment collar mounted between the laser cutting head and the process gas jet nozzle to adjust the laser beam axis with respect to the gas jet axis, the adjustment collar comprises:
   an outer housing mountable to the laser cutting head;
   an inner collar mountable to the process gas jet nozzle;
   a first actuator between the outer housing and the inner collar, the first actuator operable to move the inner collar with respect to the outer housing along an X-axis; and
   a second actuator between the outer housing and the inner collar, the second actuator operable to move the inner collar with respect to the outer housing along a Y-axis; and
   a controller in communication with the adjustment collar to move the process gas jet nozzle with respect to the laser to position the laser beam axis with respect to the gas jet axis in response to determining the capacitance with the process gas jet nozzle to find an edge of a hole in a sacrificial workpiece formed by the laser beam of the laser cutting head.

6. The laser machine tool as recited in claim 5, wherein the first actuator and the second actuator are piezoelectric motors.

* * * * *